(12) United States Patent
Gresset (10) Patent No.: US 10,264,589 B2
(45) Date of Patent: Apr. 16, 2019

(54) METHOD AND MANAGING DEVICE FOR ALLOCATING TRANSMISSION RESOURCES IN A WIRELESS COMMUNICATIONS NETWORK

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 48 days.

(21) Appl. No.: 15/525,725

(22) PCT Filed: Nov. 19, 2015

(86) PCT No.: PCT/JP2015/083302
§ 371 (c)(1),
(2) Date: May 10, 2017

(87) PCT Pub. No.: WO2016/088656
PCT Pub. Date: Jun. 9, 2016

(65) Prior Publication Data
US 2018/0295629 A1 Oct. 11, 2018

(30) Foreign Application Priority Data

Dec. 1, 2014 (EP) .................................... 14195702

(51) Int. Cl.
*H04W 72/12* (2009.01)
*H04W 72/04* (2009.01)
*H04W 72/08* (2009.01)

(52) U.S. Cl.
CPC ....... *H04W 72/082* (2013.01); *H04W 72/042* (2013.01); *H04W 72/044* (2013.01); *H04W 72/1226* (2013.01)

(58) Field of Classification Search
CPC ..... H04W 24/02; H04W 72/12; H04W 84/02; H04W 72/082; H04W 72/042; H04W 72/044; H04W 72/1226
(Continued)

(56) References Cited

U.S. PATENT DOCUMENTS

2008/0318579 A1* 12/2008 McCoy ................. H04L 5/0037
455/442
2014/0219115 A1* 8/2014 Etemad ................. H04W 28/12
370/252
2014/0269313 A1* 9/2014 Liu ....................... H04W 24/02
370/235

FOREIGN PATENT DOCUMENTS

EP          2 472 948 A2      7/2012
EP          2 744 141 A1      6/2014
WO      WO 2011/099607 A1    8/2011

* cited by examiner

*Primary Examiner* — Andrew Lai
*Assistant Examiner* — Harry H Kim
(74) *Attorney, Agent, or Firm* — Birch, Stewart, Kolasch & Birch, LLP (57) ABSTRACT

A method and managing device for allocating transmission resources in a wireless communications network for performing K individual transmissions between an access point and mobile terminals, signalling information for enabling the mobile terminals to determine transmission resources allocated in a subsequent frame being transmitted in at least one transmission resource of each frame, a managing device, when considering (S401) allocating transmission resources in a frame t: obtains (S402) information representative of transmission resources allocated beforehand from frame t−W−T+2 to frame t−1; allocates (S403) transmission resources in frame t for performing K individual transmissions and transmission resources in frame t−x for transmitting signalling information related to frame t, by reviewing transmission resources allocations from frame t−W+1 to
(Continued)

frame t−1 by relying on a figure of merit representative of a probability that at least one message in each one of the K individual transmissions is correctly received.

16 Claims, 3 Drawing Sheets

(58) Field of Classification Search
    USPC .................................................. 370/235, 330
    See application file for complete search history.

METHOD AND MANAGING DEVICE FOR ALLOCATING TRANSMISSION RESOURCES IN A WIRELESS COMMUNICATIONS NETWORK

TECHNICAL FIELD

The present invention generally relates to allocating transmission resources in a wireless communications network for performing K individual transmissions between an access point of the wireless communications network and plural mobile terminals.

BACKGROUND ART

In order to perform transmissions within a wireless communications network, transmission resources (channel related) of the wireless communications network need to be allocated by a device of the wireless communications network in charge of coordinating the resources usage. Such transmission resources depend on the type of wireless communications network to be considered. Such transmission resources can thus be time and frequency resources, codes in CDMA (Code Division Multiple Access) wireless communications networks, frequencies in OFDMA (Orthogonal Frequency Division Multiple Access) wireless communications networks, time slots in TDMA (Time Division Multiple Access) wireless communications networks.

For instance, considering time and frequency resources, time is first divided into frame periods, in which frames are respectively transmitted according to a predefined format. Each frame period comprises time slots of equal size, which thus define time resources. Plural frequencies or frequency bands are available to perform transmissions, which thus define frequency resources. Distinct fields of a single frame can then rely on distinct frequency resources. Usage of one such frequency or frequency band during one such time slot defines one time and frequency resource. Time and frequency resources are typically represented using a grid, with frequency resources represented on one axis and time resources represented on another axis.

Resources allocation shall generally be signalled within the wireless communications network in order, for each communication device of the wireless communications network, to be able to determine via which transmission resources the transmissions are expected to effectively occur. Signalling is typically performed in a fixed field of each frame, in a broadcast mode. It means that signalling relies on robust modulation and coding scheme in order to attempt overcoming the worst interference cases that under which the wireless communications network is supposed to operate. Such a configuration for transmitting signalling information is therefore not spectrally efficient, which impacts the wireless communications network performance.

It is desirable to overcome the aforementioned drawbacks of the prior art.

It is more particularly desirable to improve the performance of such wireless communications network for what concerns signalling information transmission for notifying communication devices of the wireless communications network how transmission resources are allocated per frame.

SUMMARY OF INVENTION

To that end, the present invention concerns a method for allocating transmission resources in a wireless communications network for performing K individual transmissions between an access point and plural mobile terminals, the transmissions occurring in the wireless communications network on a per frame basis, the method being performed by a managing device in charge of allocating the transmission resources for performing the K individual transmissions, signalling information intended to enable the mobile terminals to determine transmission resources that are allocated in a subsequent frame being transmitted in at least one transmission resource of each frame, wherein, for each one of the K individual transmissions, the managing device has information representative of a signal-plus-interference to noise ratio expected for each transmission resource when used by said individual transmissions, and the managing device has information representative of a signal-plus-interference to noise ratio expected for each transmission resource when said transmission resource is used for transmitting the signalling information. The method is further such that the managing device performs, when considering allocating transmission resources for the K individual transmissions in a frame identified by an index value t: obtaining information representative of the transmission resources allocated beforehand from the frame identified by the index value t−W−T+2 to the frame identified by the index value t−1, wherein W≥1 is a first predefined quantity of successive frames and T≥1 is a second predefined quantity of successive frames; allocating transmission resources in the frame identified by the index value t for performing the K individual transmissions and transmission resources in the frame identified by an index value t−x for transmitting the signalling information related to the frame identified by the index value t, by reviewing transmission resources allocations from the frame identified by the index value t−W+1 to the frame identified by the index value t−1 for maximizing the following expression:

$$\min_{0 \leq u < W} (P(t-u))$$

wherein x≥1 represents a difference in terms of quantity of frames between the frame identified by the index value t and the preceding frame in which is transmitted the signalling information related to the frame identified by the index value t, and wherein W≥x, and wherein P(t−u) is a figure of merit representative of a probability that at least one message in each one of the K individual transmissions is correctly received between the frame identified by the index value t−u−T+1 and the frame identified by the index value t−u in view of the signal-plus-interference to noise ratio; then enabling transmission of the frame identified by the index value t−W−x+1. Thus, since the transmission resource used for transmitting the signalling information is dynamically defined as for the K individual transmissions by maximizing the aforementioned expression, the performance of the wireless communications network is improved. Indeed, in prior art systems, the signalling information is broadcast by considering the worst case scenario, which leads to extra overhead to provide adequate robustness.

According to a particular feature, for reviewing transmission resources allocations from the frame identified by the index value t−W+1 to the frame identified by the index value t−1, the managing device allocates all the transmission resources of the frame identified by the index value t, and evaluates changes of the transmission resources allocations from the frame identified by the index value t−W+1 to the frame identified by the index value t−1 so as to improve the following expression:

$$\min_{0\leq u<W} (P(t-u))$$

According to a particular feature, the figure of merit P(t−u) is defined as follows:

$$P(t-u) = \prod_{k=1}^{K}\left[1-\prod_{\tau=0}^{T-1}(1-(1-E_M(k,R_{k,t-u-\tau}))(1-E_B(k,R_{0,t-u-\tau-x})))\right]$$

wherein $E_M(k, R_{k,t-u-\tau})$ represents a probability of error encountered in the individual transmission identified by the index value k by using a set $R_{k,t-u-\tau}$ of at least one transmission resource in the frame identified by the index value t−u−τ; and wherein $E_B(k, R_{0,t-u-\tau-x})$ represents a probability of error encountered in the signalling information related to the individual transmission identified by the index value k, which is transmitted using a set $R_{0,t-u-\tau-x}$ of at least one transmission resource in the frame identified by the index value t−u−τ−x.

According to a particular feature, when evaluating said changes of the transmission resources allocations, the managing device starts by testing firstly all possible changes among the transmission resources of the frame showing the worst result of the following expression:

$$(1-(1-E_M(k,R_{k,t-u-\tau}))(1-E_B(k,R_{0,t-u-\tau-x})))$$

According to a particular feature, each frame starts with a fixed field containing further signalling information intended to enable the mobile terminals to determine transmission resources that are allocated in said frame, the figure of merit P(t−u) is defined as follows:

$$P(t-u) = \prod_{k=1}^{K}\left[1-\prod_{\tau=0}^{T-1}(1-(1-E_M(k,R_{k,t-u-\tau}))(1-E_B^H(k,t-u-\tau,R_{0,t-u-\tau-x})))\right]$$

with $$E_B^H(k,t-u-\tau,R_{0,t-u-\tau-x})=E_B^S(k,t-u-\tau)\cdot E_B(k,R_{0,t-u-\tau-x})$$

wherein $E_M(k, R_{k,t-u-\tau})$ represents a probability of error encountered in the individual transmission identified by the index value k by using a set $R_{k,t-u-\tau}$ of at least one transmission resource in the frame identified by the index value t−u−τ; wherein $E_B(k, R_{0,t-u-\tau-x})$ represents a probability of error encountered in the signalling information related to the individual transmission identified by the index value k, which is transmitted using a set $R_{0,t-u-\tau-x}$ of at least one transmission resource in the frame identified by the index value t−u−τ−x, and wherein $E_B^S(k, t-u-\tau)$ represents a probability of error encountered in the signalling information related to the individual transmission identified by the index value k, which is transmitted in the fixed field of the frame identified by the index value t−u−τ.

According to a particular feature, when evaluating said changes of the transmission resources allocations, the managing device starts by testing firstly all possible changes among the transmission resources of the frame showing the worst result of the following expression:

$$(1-(1-E_M(k,R_{k,t-u-\tau}))(1-E_B^H(k,t-u-\tau,R_{0,t-u-\tau-x})))$$

According to a particular feature, when evaluating said changes of the transmission resources allocations, the managing device starts by testing firstly all possible changes among the transmission resources of the frame identified by the index t−u which shows the worst figure of merit P(t−u).

According to a particular feature, each message to be transmitted in the frame identified by the index value t−u−τ for the individual transmission identified by the index value k is spread over the set $R_{k,t-u-\tau}$ and the probability of error $E_M(k, R_{k,t-u-\tau})$ is expressed as follows:

$$E_M(k,R_{k,t-u-\tau})=f_M(\{\rho_k(R_{k,t-u-\tau}(i))\}_i)$$

wherein $f_M$ represents a multi-variable function providing data error rate as a function of a set of signal-plus-interference to noise ratios {ρ}, which depends on a behavioural model of physical layer configuration used for performing transmission over the set $R_{k,t-u-\tau}$, and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

According to a particular feature, each message to be transmitted in the frame identified by the index value t−u−τ for the individual transmission identified by the index value k is uniquely transmitted in one transmission resource, and the probability of error $E_M(k, R_{k,t-u-\tau})$ is expressed as follows:

$$E_M(k, R_{k,t-u-\tau}) = 1-\prod_i(1-f'_M(\rho_k(R_{k,t-u-\tau}(i))))$$

wherein $f'_M$ represents a function providing data error rate as a function of signal-plus-interference to noise ratio ρ, which depends on a behavioural model of physical layer configuration used for performing transmission over the set $R_{k,t-u-\tau}$, and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

According to a particular feature, each message to be transmitted in the frame identified by the index value t−u−τ for the individual transmission identified by the index value k is repeated in each transmission resource of the set $R_{k,t-u-\tau}$ and expected to be jointly decoded, and the probability of error $E_M(k, R_{k,t-u-\tau})$ is expressed as follows:

$$E_M(k, R_{k,t-u-\tau}) = f''_M\left(\sum_i \rho_k(R_{k,t-u-\tau}(i))\right)$$

wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$, and wherein $f''_M$ represents a function providing data error rate as a function of signal-plus-interference to noise ratio ρ, which depends on a behavioural model of physical layer configuration used for performing transmission over the set $R_{k,t-u-\tau}$ According to a particular feature, each message to be transmitted in the frame identified by the index value t−u−τ for the individual transmission identified by the index value k is repeated in each transmission resource of the set $R_{k,t-u-\tau}$ and expected to be decoded independently, and the probability of error $E_M(k, R_{k,t-u-\tau})$ is expressed as follows:

$$E_M(k, R_{k,t-u-\tau}) = \prod_i (f'''_M(\rho_k(R_{k,t-u-\tau}(i))))$$

wherein $f'''_M$ represents a function providing data error rate as a function of signal-plus-interference to noise ratio $\rho$, which depends on a behavioural model of physical layer configuration used for performing transmission over the set $R_{k,t-u-\tau}$, and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

According to a particular feature, the signalling information to be transmitted in the frame identified by the index value t–u–τ–x and related to the frame identified by the index value t–u–τ is uniquely transmitted in one transmission resource and the probability of error $E_B(k, R_{0,t-u-\tau-x})$ is expressed as follows:

$$E_B(k, R_{0,t-u-\tau-x}) = f_B(\rho_k(R_{0,t-u-\tau-x}(i)))$$

wherein $f_B$ represents a function providing data error rate as a function of signal-plus-interference to noise ratio $\rho$, which depends on a behavioural model of physical layer configuration used for performing transmission over the set $R_{0,t-u-\tau-x}$, and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

According to a particular feature, the signalling information to be transmitted in the frame identified by the index value t–u–τ–x and related to the frame identified by the index value t–u–τ is spread over the set $R_{0,t-u-\tau-x}$ and expected to be jointly decoded, and the probability of error $E_B(k, R_{0,t-u-\tau-x})$ is expressed as follows:

$$E_B(k, R_{0,t-u-\tau-x}) = f'_B\left(\sum_i \rho_k(R_{0,t-u-\tau-x}(i))\right)$$

wherein $f'_B$ represents a function providing data error rate as a function of signal-plus-interference to noise ratio $\rho$, which depends on a behavioural model of physical layer configuration used for performing transmission over the set $R_{0,t-u-\tau-x}$, and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

According to a particular feature, the signalling information to be transmitted in the frame identified by the index value t–u–τ–x and related to the frame identified by the index value t–u–τ is repeated in each transmission resource of the set $R_{0,t-u-\tau-x}$ and expected to be decoded independently, and the probability of error $E_B(k, R_{0,t-u-\tau-x})$ is expressed as follows:

$$E_B(k, R_{0,t-u-\tau-x}) = \prod_i (f''_B(\rho_k(R_{0,t-u-\tau-x}(i))))$$

wherein $f''_B$ represents a function providing data error rate as a function of signal-plus-interference to noise ratio $\rho$, which depends on a behavioural model of physical layer configuration used for performing transmission over the set $R_{0,t-u-\tau-x}$, and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

According to a particular feature, the difference in terms of quantity of frames between the frame identified by the index value t and the preceding frame in which is transmitted the signalling information related to the frame identified by the index value t equals to "1".

The invention also concerns a managing device for allocating transmission resources in a wireless communications network for performing K individual transmissions between an access point and plural mobile terminals, the transmissions occurring in the wireless communications network on a per frame basis, signalling information intended to enable the mobile terminals to determine transmission resources that are allocated in a subsequent frame being transmitted in at least one transmission resource of each frame, wherein, for each one of the K individual transmissions, the managing device has information representative of a signal-plus-interference to noise ratio expected for each transmission resource when used by said individual transmissions, and the managing device has information representative of a signal-plus-interference to noise ratio expected for each transmission resource when said transmission resource is used for transmitting the signalling information. The managing device is further such that it implements, when considering allocating transmission resources for the K individual transmissions in a frame identified by an index value t: means for obtaining information representative of the transmission resources allocated beforehand from the frame identified by the index value t–W–T+2 to the frame identified by the index value t–1, wherein W≥1 is a first predefined quantity of successive frames and T≥1 is a second predefined quantity of successive frames; means for allocating transmission resources in the frame identified by the index value t for performing the K individual transmissions and transmission resources in the frame identified by an index value t–x for transmitting the signalling information related to the frame identified by the index value t, by reviewing transmission resources allocations from the frame identified by the index value t–W+1 to the frame identified by the index value t–1 for maximizing the following expression:

$$\min_{0 \leq u < W} (P(t - u))$$

wherein x≥1 represents a difference in terms of quantity of frames between the frame identified by the index value t and the preceding frame in which is transmitted the signalling information related to the frame identified by the index value t, and wherein W≥x, and wherein P(t–u) is a figure of merit representative of a probability that at least one message in each one of the K individual transmissions is correctly received between the frame identified by the index value t–u–T+1 and the frame identified by the index value t–u in view of the signal-plus-interference to noise ratio;

then means for enabling transmission of the frame identified by the index value t−W−x+1.

The present invention also concerns a computer program that can be downloaded from a communications network and/or stored on a medium that can be read by a processing device. This computer program comprises instructions for causing implementation of the method mentioned above in relation with the managing device, when said program is run by the processing device. The present invention also concerns information storage means, storing a computer program comprising a set of instructions causing implementation of the method mentioned above in relation with the managing device, when the stored information is read from said information storage means and run by the processing device.

Since the features related to the managing device and to the computer program are similar to those already mentioned with regard to the corresponding aforementioned methods, the corresponding advantages are not repeated here.

The characteristics of the invention will emerge more clearly from a reading of the following description of an example of embodiment, said description being produced with reference to the accompanying drawings, among which:

DESCRIPTION OF EMBODIMENTS

It is considered herein a wireless communications network providing transmission resources for performing individual transmissions within the wireless communications network. Transmissions in the wireless communications network are performed on a per frame basis. The individual transmissions are performed in the form of messages. Each message can be transmitted in a single transmission resource, or repeated in plural transmission resources, or spread over plural transmission resources. Individual transmissions means that said transmissions are not correlated to each other, e.g. no constraint on whether one or another of said individual transmissions is performed first within one frame. It has to be noted that each transmission resource cannot be allocated to more than one transmission.

Figure 1:
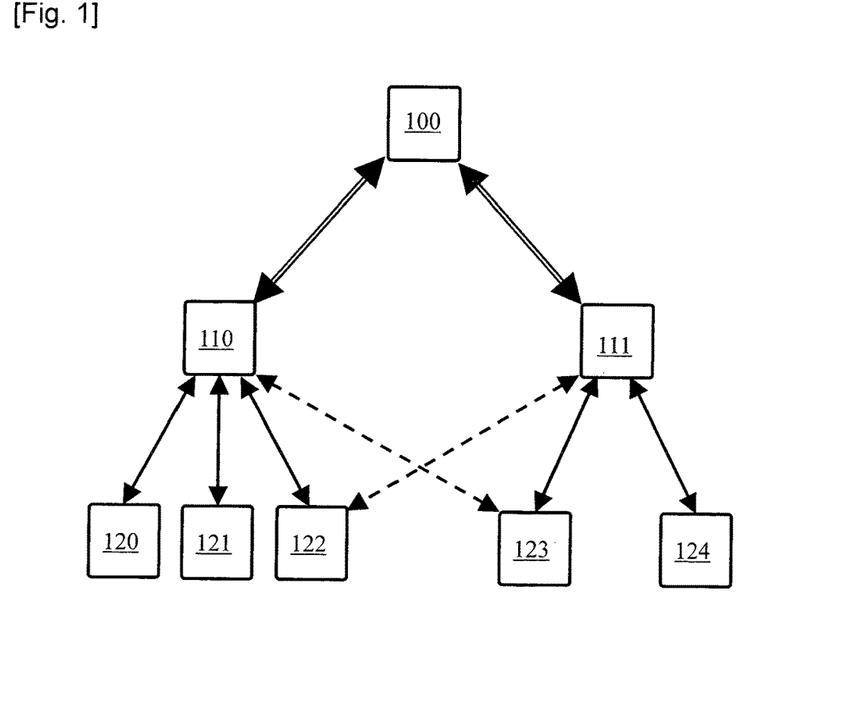
FIG. 1 schematically represents a wireless communications network in which the present invention may be implemented.

FIG. 1 schematically represents a wireless communications network in which the present invention may be implemented.

The wireless communications network shown in FIG. 1 comprises plural communication devices, including at least one access point AP and plural mobile terminals. The wireless communications network preferably comprises plural APs. Two APs 110, 111 are illustratively represented in FIG. 1. Each mobile terminal is attached to one AP according to its geographical location, i.e. accesses services of the wireless communications network via the AP to which said mobile terminal is attached. In FIG. 1, it is illustratively represented that three mobile terminals 120, 121, 122 are attached to the AP 110 and two mobile terminals 123, 124 are attached to the AP 111. The wireless communications network is active over land areas referred to as cells. Each AP of the wireless communications network manages a cell allowing mobile terminals present in the land area of the cell to benefit from the services of the wireless communications network via the AP managing the cell, i.e. to which said mobile terminals are attached.

Therefore, in FIG. 1, the mobile terminals 120, 121, 122 communicate within the wireless communications network via the AP 110, and the mobile terminals 123, 124 communicate within the wireless communications network via the AP 111, as represented by solid line arrows in FIG. 1. The wireless communications network preferably further comprises a server 100 connected to each AP in order to allow implementing the services of the wireless communications network.

It is further represented in FIG. 1 that, from the standpoint of the mobile terminal 123, downlink and/or uplink communications between the AP 110 and the mobile terminal 122 may interfere with the downlink and/or uplink communications between the AP 111 and the mobile terminal 123. From the standpoint of the mobile terminal 122, downlink and/or uplink communications between the AP 111 and the mobile terminal 123 may interfere with the downlink and/or uplink communications from the AP 110 and the mobile terminal 122. Such interference is represented in FIG. 1 by dashed line arrows. Other interference not relative to downlink and/or uplink communications in the wireless communications network may occur due to presence of external interferers located in the vicinity of the mobile terminals and/or in the vicinity of the APs. Coping with such interference, or noise or path loss, can be performed thanks to frequency hopping when allocating time and frequency resources for transmissions. Frequency hopping provides diversity in terms of frequency resources usage, which allows the transmissions to be robust to narrowband interference.

The expression "downlink communications" refers herein, as typically understood by the one skilled in the art, to communications from a considered access point to a considered mobile terminal. The expression "uplink communications" refer herein, as typically understood by the one skilled in the art, to communications from a considered mobile terminal to a considered access point.

The server 100 is in charge of performing transmission resources allocations within the wireless communications network. To achieve this, the server 100 communicates with the APs 110, 111 so as to receive and process allocation requests. In a variant, the allocations of transmission resources are not performed by the server 100, but by the APs 110, 111 themselves.

A device, i.e. an AP or the server 100, in charge of performing time and frequency resources allocations within the wireless communications network may be referred to as managing device.

Transmissions between the APs and the mobile terminals respectively attached thereto are considered as individual transmissions, i.e. uncorrelated transmissions.

In an illustrative manner, the mobile terminals considered herein may be communication devices installed in trains performing journeys on railroads on the edge of which the APs 110, 111 are located.

Figure 2A:
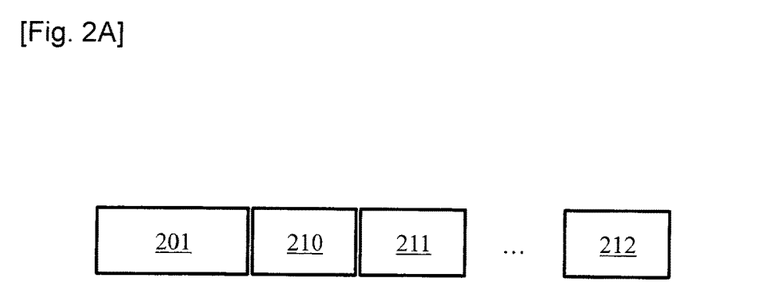
FIG. 2A schematically represents a first frame format, as can be used within the wireless communications network.
Figure 2B:
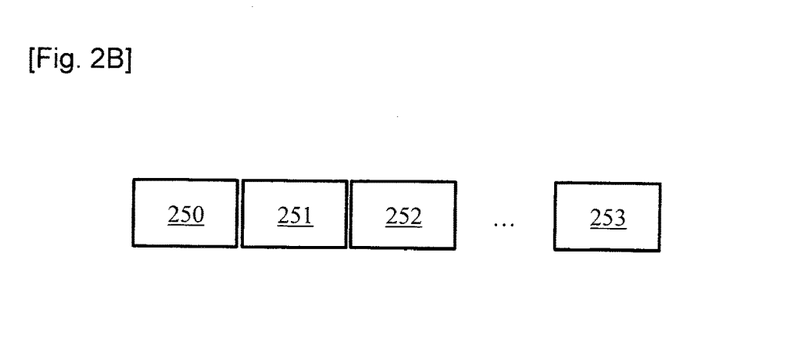
FIG. 2B schematically represents a second frame format, as can be used within the wireless communications network.

The transmissions within the wireless communications network occur on a per frame basis. FIGS. 2A and 2B provides two alternative frame formats that can be used for transmitting data between an AP, such as the AP 110, and the plurality of mobile terminals attached thereto. The frame formats represented in FIGS. 2A and 2B are illustratively based on usage of time and frequency resources as transmission resources.

Whatever the frame format in use, the signalling information contained in any payload field (as defined hereafter with regard to FIGS. 2A and 2B) relates to the transmission resources allocation for a subsequent frame (compared to the one in which said signalling information is transmitted). The difference x in terms of quantity of frames between the frame containing said signalling information and the frame to which said signalling information relates is predefined, and known by the mobile terminals attached to the AP transmitting said signalling information. In a preferred embodiment, x=1, which means that the signalling information contained in any payload field relates to the transmission resources allocation for the immediately following frame.

FIG. 2A schematically represents a first frame format, as can be used within the wireless communications network. The first frame format is herein referred to as hybrid mode.

The first frame format is such that the frame starts with a fixed field 201 dedicated to signalling information. The fixed field 201 is intended to contain the signalling information that applies to the frame in which the fixed field 201 is present. The fixed field 201 is transmitted over at least one predefined frequency that is also known by each mobile terminal attached to the considered AP. The fixed field 201 is intended to be received by each mobile terminal attached to the AP transmitting said fixed field 201, since said fixed field 201 contains signalling information (broadcast mode). Said AP therefore applies adequate modulation and coding scheme in order to limit risks that the fixed field 201 be not received by one or more mobile terminals attached to said AP.

The first frame format is further such that the frame continues with a set of N payload fields 210, 211, 212, wherein N≥2. Each payload field 210, 211, 212 has a duration that corresponds to a time resource. One payload field is present in the frame for each time resource used in the considered frame period. Each payload field 210, 211, 212 is either dedicated to transmitting data in the scope of one or another of the K individual transmissions, or to transmitting further signalling data. As would be detailed hereafter, one or another of the K individual transmissions may have no transmission resources allocated in the considered frame, or one transmission resource, or plural transmission resources. Each frame however comprises signalling information in one or more payload fields.

In a first embodiment, considering that each frame period is dedicated to downlink communications, in order to allow each mobile terminal attached to the considered AP to determine whether data contained in any payload field is addressed to said mobile terminal, each payload field 210, 211, 212 contains an identifier of the concerned individual transmission among the K individual transmissions. The signalling information therefore consists in transmitting the frequency hopping sequence applicable to the considered frame period. When the considered payload field 210, 211, 212 contains signalling information, said payload field contains an identifier reserved for indicating that said payload field contains signalling information. The signalling information contained in one or more payload fields 210, 211, 212 may therefore be another exemplar of the signalling information transmitted in the fixed field 201 of the frame to which the signalling information contained in one or more payload fields 210, 211, 212 relates. The signalling information contained in one or more payload fields 210, 211, 212 may in a variant complement the signalling information transmitted in the fixed field 201 of the frame to which the signalling information contained in one or more payload fields 210, 211, 212 relates.

In a second embodiment, the signalling information indicates, for at least one time resource of the frame period to which said signalling information relates, whether said time resource is intended to be used for downlink communication or for uplink communication, in association with an identifier representative of the individual transmission among the K individual transmissions to which said time resource is allocated. The signalling information contained in one or more payload fields 210, 211, 212 may therefore be another exemplar of the signalling information transmitted in the fixed field 201 of the frame to which the signalling information contained in one or more payload fields 210, 211, 212 relates. The signalling information contained in one or more payload fields 210, 211, 212 may in a variant complement the signalling information transmitted in the fixed field 201 of the frame to which the signalling information contained in one or more payload fields 210, 211, 212 relates.

FIG. 2B schematically represents a second frame format, as can be used within the wireless communications network. The second frame format is herein referred to as dynamic mode.

The second frame format is such that the frame directly starts with a set of N payload fields 250, 251, 252, 253. It means that compared to the first frame format shown in FIG. 2A, no static signalling field is present at the beginning of the frame. The signalling information is therefore contained in one or more payload fields 250, 251, 252, 253. As for the first frame format shown in FIG. 2A, each payload field 250, 251, 252, 253 has a duration that corresponds to a time resource. One payload field is present in the frame for each time resource used in the considered frame period. Each payload field 251, 252, 253 is either dedicated to transmitting data in the scope of one or another of the K individual transmissions, or to transmitting the signalling data. As would be detailed hereafter, one or another of the K individual transmissions may have no transmission resources allocated in the considered frame, or one transmission resource, or plural transmission resources. Each frame however comprises signalling information in one or more payload fields.

In a first embodiment, considering that the considered frame period is dedicated to downlink communications, in order to allow each mobile terminal attached to the considered AP to determine whether data contained in any payload field is addressed to said mobile terminal, each payload field 250, 251, 252, 253 contains an identifier of the concerned individual transmission among the K individual transmissions. When the considered payload field contains signalling information, said payload field contains an identifier reserved for indicating that said payload field contains signalling information.

In a second embodiment, the signalling information contained in one payload field 250, 251, 252, 253 indicates, for at least one time resource of the frame period to which the signalling information relates, whether said time resource is intended to be used for downlink communication or for uplink communication, in association with an identifier representative of the individual transmission among the K individual transmissions to which said time resource is allocated.

Figure 3:
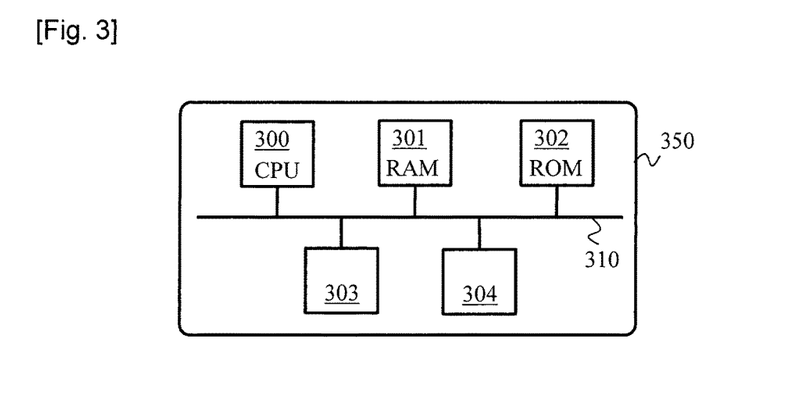
FIG. 3 schematically represents a hardware architecture of a communication device of the wireless communications network.

FIG. 3 schematically represents a communication device 350 of the wireless communications network. The communication device 350 may be a representation of an AP, such as the AP 110, and/or may be a representation of a mobile terminal, such as the mobile terminal 120, and/or may be a representation of the server 100.

According to the shown architecture, the communication device 350 comprises the following components interconnected by a communications bus 310: a processor, microprocessor, microcontroller or CPU (Central Processing Unit) 300; a RAM (Random-Access Memory) 301; a ROM (Read-Only Memory) 302; an HDD (Hard-Disk Drive) or an SD (Secure Digital) card reader 303, or any other device adapted to read information stored on storage means; and, a set of at least one communication interface 304.

The set of at least one communication interface 304 allows the communication device to communicate with at least one other communication device of the wireless communications network.

CPU 300 is capable of executing instructions loaded into RAM 301 from ROM 302 or from an external memory, such as an SD card. After the communication device 350 has been powered on, CPU 300 is capable of reading instructions from RAM 301 and executing these instructions. The instructions form one computer program that causes CPU 300, and thus the communication device 350, to perform some or all of the steps of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 4:
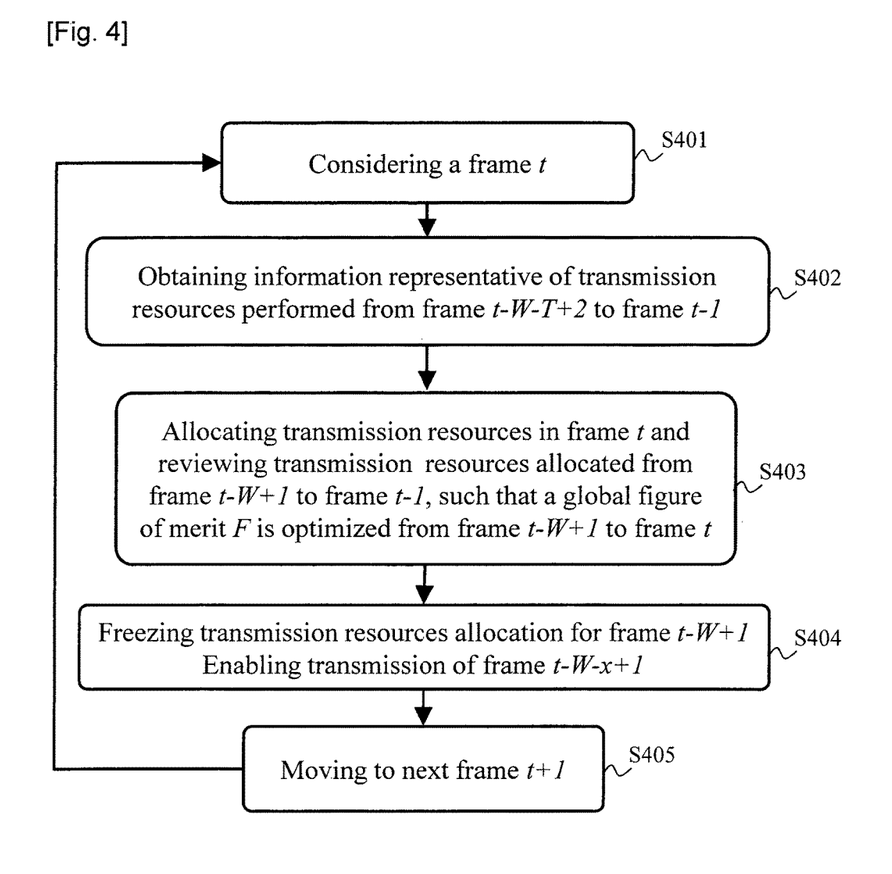
FIG. 4 schematically represents an algorithm for allocating transmission resources within the wireless communications network.

FIG. 4 schematically represents an algorithm, performed by the managing device, for allocating transmission resources within the wireless communications network.

It is considered in the scope of the algorithm of FIG. 4 that, for each one of the K individual transmissions, the managing device has information representative of a signal-plus-interference to noise ratio expected for each transmission resource when used by said individual transmissions. Moreover, the managing device has, for each transmission resource, information representative of a signal-plus-interference to noise ratio expected (from the standpoints of the mobile terminals) when used for transmitting signalling information.

For downlink communications, the signal-plus-interference to noise ratio is data that allows characterizing useful signal power and interference level, as expected to be perceived by the considered mobile terminal (to which the considered transmission is addressed), for each transmission resource in view of the location of said mobile terminal. Such a useful signal power and interference level can be obtained from downlink measurements performed by mobile terminals. For example, the measurements are the received signal power on a given transmission resource at a given location, or frame error rates from which short-term signal-plus-interference to noise ratios can be deduced and therefore a long-term signal-plus-interference to noise ratio can be obtained by averaging the short-term signal-plus-interference to noise ratios.

For uplink communications, the signal-plus-interference to noise ratio is data that allows characterizing the useful signal power and the interference level, as expected to be perceived by the considered AP when receiving signals from a mobile terminal, for each transmission resource in view of the location of said mobile terminal. Such a useful signal power and interference level can be obtained from measurements performed by said AP. For example, each measurement is the received signal power via a given transmission resource at a given mobile terminal location. The measurements can be frame error rates from which short-term signal-plus-interference to noise ratios can be deduced and therefore a long-term signal-plus-interference to noise ratio can be obtained by averaging the short-term signal-plus-interference to noise ratios.

Alternatively, either for downlink communications or for uplink communications, one can rely for determining the signal-plus-interference to noise ratio on statistics of acknowledgements when an ACK/NACK (Acknowledgement/Non-Acknowledgement) mechanism is implemented in the communication protocol between the APs and the mobile terminals.

In a preferred embodiment, the processing device determines such a useful signal and interference level from a fingerprint map of long-term signal-plus-interference to noise ratio stored in a database, the fingerprint map of long-term signal-plus-interference to noise ratio being built from the useful signals power and interference observed during preceding journeys of mobile terminals within the cell managed by the considered AP.

In a step S401, the managing device considers allocating transmission resources for the K individual transmissions in a frame identified by an index value t.

In a following step S402, the managing device obtains information representative of the transmission resources allocated beforehand from the frame identified by the index value $t-W-T+2$ to the frame identified by the index value $t-1$, wherein $W \geq 1$ is a first predefined quantity of successive frames and wherein $T \geq 1$ is a second predefined quantity of successive frames. The frames from the frame identified by the index value $t-W+1$ to the frame identified by the index value $t-1$ forms a working window of size W in which the managing device is able to modify transmission resources allocations that were performed beforehand. Knowledge of the transmission resources allocation from the frame identified by the index value $t-W-T+2$ to the frame identified by the index value $t-W$ is needed in order to be able to perform figure of merit computation, as detailed hereafter. The value T is defined such that at least one message is supposed to be transmitted per individual transmission in any succession of T frames.

It means that the transmission of the frame identified by the index value $t-W+1$ cannot be performed before transmission resources allocations for the frame identified by the index value t are performed at least once (maybe reviewed later on), since the managing device may modify the transmission resources allocations that were performed beforehand for said frame identified by the index value $t-W+1$. Since the signalling information of the frame identified by the index value $t-W+1$ is at least partly provided in the frame identified by the index value $t-W-x+1$, it even means that the transmission of the frame identified by the index value $t-W-x+1$ cannot be performed before transmission resources allocations for the frame identified by the index value t are performed at least once (and maybe reviewed later on), since the managing device needs to know the effective transmission resources allocations for the frame identified by the index value t−W+1 before transmitting the signalling information in the frame identified by the index value t−W−x+1.

In a following step S403, the managing device allocates transmission resources in the frame identified by the index value t for performing the K individual transmissions and at least one transmission resource in the frame identified by the index value t−x for transmitting the signalling information related to the frame identified by the index value t, by reviewing the transmission resources allocated from the frame identified by the index value t−W+1 to the frame identified by the index value t−1 for maximizing the following expression:

$$\min_{0 \leq u < W} (P(t-u))$$

wherein P(t−u) is a figure of merit representative of a probability that at least one message in each one of the K individual transmissions is correctly received between the frame identified by the index value t−u−T+1 and the frame identified by the index value t−u in view of the signal-plus-interference to noise ratio, wherein T≥1 is a second predefined quantity of successive frames. The frames from the frame identified by the index value t−T+1 to the frame identified by the index value t thus forms a processing window of size T used by the managing device for determining the figure of merit P(t).

The second predefined quantity of successive frames T may be lower than, or equal to, or greater than the first predefined quantity of successive frames W. Both quantities are indeed independent.

In the dynamic mode, the figure of merit P(t−u) can be defined as follows:

$$P(t-u) = \prod_{k=1}^{K}\left[1 - \prod_{\tau=0}^{T-1}(1-(1-E_M(k, R_{k,t-u-\tau}))(1-E_B(k, R_{0,t-u-\tau-x})))\right]$$

wherein $E_M(k, R_{k,t-u-\tau})$ represents a probability of error encountered in the individual transmission identified by the index value k (from amongst the K individual transmissions) by using a transmission resource set $R_{k,t-u-\tau}$ (that may be empty) in the frame identified by the index value t−u−τ, and wherein $E_B(k, R_{0,t-u-\tau-x})$ represents a probability of error encountered in the signalling information (therefore identified by the index value "0") related to the individual transmission identified by the index value k, which is transmitted using a set $R_{0,t-u-\tau-x}$ of at least one transmission resource in the frame identified by the index value t−u−τ−x. When the transmission resource set $R_{k,t-u-\tau}$ is empty, the probability of error $E_M(k, R_{k,t-u-\tau})$ is by convention equal to "1".

In the hybrid mode, the figure of merit P(t−u) can be defined as follows:

$$P(t-u) = \prod_{k=1}^{K}\left[1 - \prod_{\tau=0}^{T-1}(1-(1-E_M(k, R_{k,t-u-\tau}))(1-E_B^H(k, t-u-\tau, R_{0,t-u-\tau-x})))\right]$$

with $$E_B^H(k,t-u-\tau,R_{0,t-u-\tau-x}) = E_B^S(k,t-u-\tau) \cdot E_B(k,R_{0,t-u-\tau-x})$$

wherein $E_B^S(k,t-u-\tau)$ represents a probability of error encountered in the signalling information related to the individual transmission identified by the index value k (from the standpoint of the mobile terminal to which said individual transmission is addressed), which is transmitted in the fixed field 201 of the frame identified by the index value t−u−τ.

Let's define a global figure of merit F(t) such that:

$$F(t) = \min_{0 \leq u < W}(P(t-u))$$

According to a particular embodiment of the probability of error $E_M(k, R_{k,t-u-\tau})$, each message to be transmitted in the frame identified by the index value t−u−τ for the individual transmission identified by the index value k is spread over the set $R_{k,t-u-\tau}$ and the probability of error $E_M(k, R_{k,t-u-\tau})$ is expressed as follows:

$$E_M(k,R_{k,t-u-\tau}) = f_M(\{\rho_k(R_{k,t-u-\tau}(i))\}_i)$$

wherein $\rho_k(R_{k,t-u-\tau}(i))$ represents the signal-plus-interference to noise ratio expected to be encountered for said message (of the individual transmission identified by the index value k) in the transmission resource $R_{k,t-u-\tau}(i)$ identified by the index i among the set $R_{k,t-u-\tau}$, which means that $\{\rho(R_{k,t-u-\tau}(i))\}_i$ represents the signal-plus-interference to noise ratio values for the set $R_{k,t-u-\tau}$ of transmission resources for the individual transmission identified by the index value k, and wherein $f_M$ is a multi-variable function providing data error rate as a function of a set of signal-plus-interference to noise ratios $\{\rho\}$, which depends on a behavioural model of physical layer configuration used for performing transmission over the set $R_{k,t-u-\tau}$ (error correcting code rate, modulation scheme, . . . ). The definition of the function $f_M$ is typically obtained by performing computer simulations and storing the results in a look up table (LUT) form for a discrete set of signal to noise ratio values, which are then interpolated for obtaining $f_M(\{\rho\})$. Another approach is to first convert the set of signal-plus-interference to noise ratio $\{\rho\}$ into an equivalent signal-plus-interference to noise ratio $\rho'$ and use a mono-variable function $\tilde{f}_M$ for example obtained by performing computer simulations and storing the results in a look up table (LUT) form for a discrete set of signal to noise ratio values, which are then interpolated for obtaining $\tilde{f}_M(\rho')$, but can also rely on theoretical approximations of $\tilde{f}_M$ in the form $\lambda_M Q(\sqrt{\theta_M \rho})$ where $\lambda_M$ and $\theta_M$ are tuning parameters and Q represents the Marcum's function.

According to another particular embodiment of the probability of error $E_M(k, R_{k,t-u-\tau})$, each message to be transmitted in the frame identified by the index value t−u−τ for the individual transmission identified by the index value k is uniquely transmitted in one transmission resource, and the probability of error $E_M(k, R_{k,t-u-\tau})$ is expressed as follows:

$$E_M(k, R_{k,t-u-\tau}) = 1 - \prod_i(1 - f'_M(\rho_k(R_{k,t-u-\tau}(i))))$$

wherein $\rho_k(R_{k,t-u-\tau}(i))$ represents the signal-plus-interference to noise ratio expected to be encountered for the message (of the individual transmission identified by the index k) in the transmission resource $R_{k,t-u-\tau}(i)$ identified by the index i among the set $R_{k,t-u-\tau}$, and wherein $f'_M$ represents a function providing data error rate as a function of signal-plus-interference to noise ratio ρ, which depends on a behavioural model of physical layer configuration used for performing transmission over the set $R_{k,t-u-\tau}$ (error correcting code rate, modulation scheme, . . . ). The definition of the function $f'_M$ is obtained in the same way as the definition of the aforementioned function $f_M$. When relying on theoretical approximation of $f'_M$ in the form $\lambda'_M Q(\sqrt{\theta'_M \rho})$, the tuning parameters $\lambda'_M$ and $\theta'_M$ are respectively distinct from the aforementioned tuning parameters $\lambda_M$ and $\theta_M$ when different modulation and/or coding schemes are used in both cases. Otherwise, the tuning parameters $\lambda'_M$ and $\theta'_M$ are respectively equal to the aforementioned tuning parameters $\lambda_M$ and $\theta_M$.

According to yet another particular embodiment of the probability of error $E_M(k, R_{k,t-u-\tau})$, each message to be transmitted in the frame identified by the index value t–u–τ for the individual transmission identified by the index value k is repeated in each transmission resource of the set $R_{k,t-u-\tau}$ and expected to be jointly decoded, and the probability of error $E_M(k, R_{k,t-u-\tau})$ is expressed as follows:

$$E_M(k, R_{k,t-u-\tau}) = f''_M\left(\sum_i \rho_k(R_{k,t-u-\tau}(i))\right)$$

wherein $\rho_k(R_{k,t-u-\tau}(i))$ represents the signal-plus-interference to noise ratio expected to be encountered for the message (of the individual transmission identified by the index k) in the transmission resource $R_{k,t-u-\tau}(i)$ identified by the index i among the set $R_{k,t-u-\tau}$, and wherein $f''_M$ represents a function providing data error rate as a function of signal-plus-interference to noise ratio ρ, which depends on a behavioural model of physical layer configuration used for performing transmission over the set $R_{k,t-u-\tau}$ (error correcting code rate, modulation scheme, . . . ). The definition of the function $f''_M$ is obtained in the same way as the definition of the aforementioned function $f_M$. When relying on theoretical approximation of $f''_M$ in the form $\lambda''_M Q(\sqrt{\theta''_M \rho})$, the tuning parameters $\lambda''_M$ and $\theta''_M$ are respectively distinct from the aforementioned tuning parameters $\lambda_M$ and $\theta_M$ when different modulation and/or coding schemes are used in both cases. Otherwise, the tuning parameters $\lambda''_M$ and $\theta''_M$ are respectively equal to the aforementioned tuning parameters $\lambda_M$ and $\theta_M$.

According to yet another particular embodiment of the probability of error $E_M(k, R_{k,t-u-\tau})$, each message to be transmitted in the frame identified by the index value t–u–τ for the individual transmission identified by the index value k is repeated in each transmission resource of the set $R_{k,t-u-\tau}$ and expected to be decoded independently, and the probability of error $E_M(k, R_{k,t-u-\tau})$ is expressed as follows:

$$E_M(k, R_{k,t-u-\tau}) = \prod_i (f'''_M(\rho_k(R_{k,t-u-\tau}(i))))$$

wherein $\rho_k(R_{k,t-u-\tau}(i))$ represents the signal-plus-interference to noise ratio expected to be encountered for the message (of the individual transmission identified by the index k) in the transmission resource $R_{k,t-u-\tau}(i)$ identified by the index i among the set $R_{k,t-u-\tau}$, and wherein $f'''_M$ represents a function providing data error rate as a function of signal-plus-interference to noise ratio ρ, which depends on a behavioural model of physical layer configuration used for performing transmission over the set $R_{k,t-u-\tau}$ (error correcting code rate, modulation scheme, . . . ). The definition of the function $f'''_M$ is obtained in the same way as the definition of the aforementioned function $f_M$. When relying on theoretical approximation of $f'''_M$ in the form $\lambda'''_M Q(\sqrt{\theta'''_M \rho})$, the tuning parameters $\lambda'''_M$ and $\theta'''_M$ are respectively distinct from the aforementioned tuning parameters $\lambda_M$ and $\theta_M$ when different modulation and/or coding schemes are used in both cases. Otherwise, the tuning parameters $\lambda'''_M$ and $\theta'''_M$ are respectively equal to the aforementioned tuning parameters $\lambda_M$ and $\theta_M$.

According to a particular embodiment of the probability of error $E_B(k, R_{0,t-u-\tau-x})$, the signalling information to be transmitted in the frame identified by the index value t–u–τ–x and related to the frame identified by the index value t–u–τ is uniquely transmitted in one transmission resource and the probability of error $E_B(k, R_{0,t-u-\tau-x})$ is expressed as follows:

$$E_B(k, R_{0,t-u-\tau-x}) = f_B(\rho_k(R_{0,t-u-\tau-x}(i)))$$

wherein $\rho_k(R_{k,t-u-\tau}(i))$ represents the signal-plus-interference to noise ratio expected to be encountered for the signalling information concerning the individual transmission identified by the index k (from the standpoint of the mobile terminal to which said individual transmission is addressed) in the transmission resource $R_{0,t-u-\tau-x}(i)$ identified by the index i among the set $R_{0,t-u-\tau-x}$, and wherein $f_B$ represents a function providing data error rate as a function of signal-plus-interference to noise ratio ρ, which depends on a behavioural model of physical layer configuration used for performing transmission over the set $R_{0,t-u-\tau-x}$ (error correcting code rate, modulation scheme, . . . ). The definition of the function $f_B$ is obtained in the same way as the definition of the aforementioned function $f'_M$. When relying on theoretical approximation of $f_B$ in the form $\lambda_B Q(\sqrt{\theta_B \rho})$, the tuning parameters $\lambda_B$ and $\theta_B$ are respectively distinct from the aforementioned tuning parameters $\lambda_M$ and $\theta_M$ when different modulation and/or coding schemes are used in both cases, which is typically the case since signalling information is generally transmitted in a more robust manner than user data. Otherwise, the tuning parameters $\lambda_B$ and $\theta_B$ are respectively equal to the aforementioned tuning parameters $\lambda_M$ and $\theta_M$.

According to another particular embodiment of the probability of error $E_B(k, R_{0,t-u-\tau-x})$, the signalling information to be transmitted in the frame identified by the index value and related to the frame identified by the index value t–u–τ is repeated in each transmission resource of the set $R_{0,t-u-\tau-x}$ and expected to be jointly decoded, and the probability of error $E_B(k, R_{0,t-u-\tau-x})$ is expressed as follows:

$$E_B(k, R_{0,t-u-\tau-x}) = f'_B\left(\sum_i \rho_k(R_{0,t-u-\tau-x}(i))\right)$$

wherein $\rho_k(R_{0,t-u-\tau-x}(i))$ represents the signal-plus-interference to noise ratio expected to be encountered for the signalling information concerning the individual transmission identified by the index k (from the standpoint of the mobile terminal to which said individual transmission is addressed) in the transmission resource $R_{0,t-u-\tau-x}(i)$ identified by the index i among the set $R_{0,t-u-\tau-x}$, and wherein $f'_B$ represents a function providing data error rate as a function of signal-plus-interference to noise ratio ρ, which depends on a behavioural model of physical layer configuration used for performing transmission over the set $R_{0,t-u-\tau-x}$ (error correcting code rate, modulation scheme, . . . ). The definition of the function $f'_B$ is obtained in the same way as the definition of the aforementioned function $f_B$. When relying on theoretical approximation of $f'_B$ in the form $\lambda'_B Q(\sqrt{\theta'_B \rho})$, the tuning parameters $\lambda'_B$ and $\theta'_B$ are respectively distinct from the aforementioned tuning parameters $\lambda_B$ and $\theta_B$ when different modulation and/or coding schemes are used in both cases. Otherwise, the tuning parameters $\lambda'_B$ and $\theta'_B$ are respectively equal to the aforementioned tuning parameters $\lambda_B$ and $\theta_B$.

According to yet another particular embodiment of the probability of error $E_B(k, R_{0,t-u-\tau-x})$, the signalling information to be transmitted in the frame identified by the index value $t-u-\tau-x$ and related to the frame identified by the index value $t-u-\tau$ is repeated in each transmission resource of the set $R_{0,t-u-\tau-x}$ and expected to be decoded independently, and the probability of error $E_B(k, R_{0,t-u-\tau-x})$ is expressed as follows:

$$E_B(k, R_{0,t-u-\tau-x}) = \prod_i (f''_B(\rho_k(R_{0,t-u-\tau-x}(i))))$$

wherein $\rho_k(R_{0,t-u-\tau-x}(i))$ represents the signal-plus-interference to noise ratio expected to be encountered for the signalling information concerning the individual transmission identified by the index k (from the standpoint of the mobile terminal to which said individual transmission is addressed) in the transmission resource $R_{0,t-u-\tau-x}(i)$ identified by the index i among the set $R_{k,t-u-\tau-x}$, and wherein $f''_B$ represents a function providing data error rate as a function of signal-plus-interference to noise ratio $\rho$, which depends on a behavioural model of physical layer configuration used for performing transmission over the set $R_{0,t-u-\tau-x}$ (error correcting code rate, modulation scheme, . . . ). The definition of the function $f''_B$ is obtained in the same way as the definition of the aforementioned function $f_B$. When relying on theoretical approximation of $f''_B$ in the form $\lambda''_B Q(\sqrt{\theta''_B \rho})$, the tuning parameters $\lambda''_B$ and $\theta''_B$ are respectively distinct from the aforementioned tuning parameters $\lambda_B$ and $\theta_B$ when different modulation and/or coding schemes are used in both cases. Otherwise, the tuning parameters $\lambda''_B$ and $\theta''_B$ are respectively equal to the aforementioned tuning parameters $\lambda_B$ and $\theta_B$.

Figure 5:
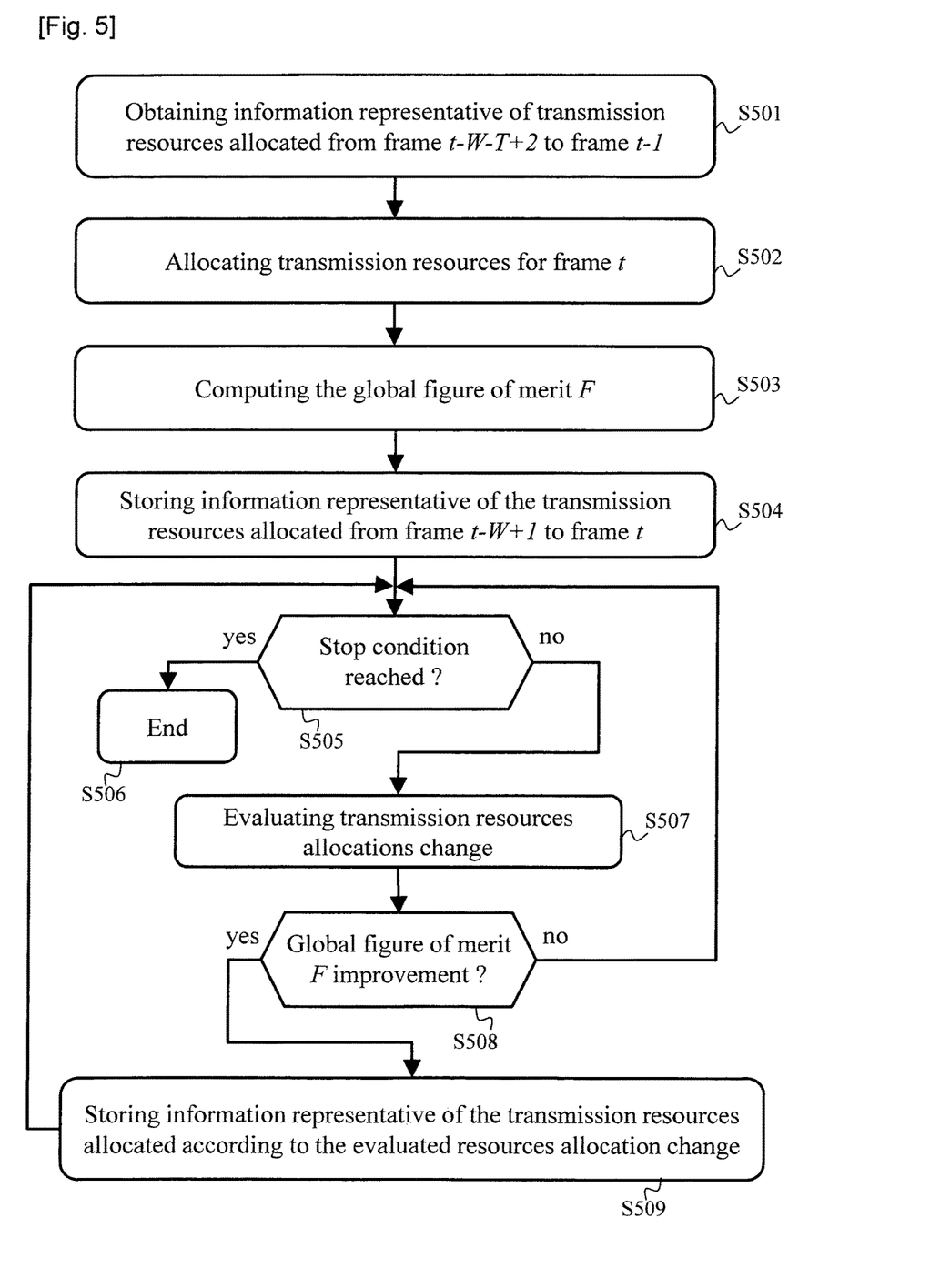
FIG. 5 schematically represents an algorithm for reviewing transmission resources allocations.

An embodiment for reviewing the transmission resources allocated from the frame identified by the index value t−W+1 to the frame identified by the index value t−1 is detailed hereafter with regard to FIG. 5.

In a following step S404, the managing device freezes the transmission resources allocations, resulting from the reviewing operation performed in the step S403, for the frame identified by the index value t−W+1. Therefore, the contents of the signalling information transmitted in the frame identified by the index value t−W−x+1, and which relates to the frame identified by the index value t−W+1, is defined. Then, the managing device enables the transmission of the frame identified by the index value t−W−x+1. It means that the managing device starts considering transmission resources allocations for the frame identified by the index value t before the frame identified by the index value t−W+1 needs to be transmitted.

In a following step S405, the managing device moves to the frame identified by the index value t+1, i.e. the managing device starts considering transmission resources allocations for the frame identified by the index value t+1, and reiterate the algorithm from the step S402 with the frame identified by the index value t+1 instead of the frame identified by the index value t.

FIG. 5 schematically represents an algorithm, performed by the managing device, for reviewing transmission resources allocations. At the beginning of the algorithm of FIG. 5, the managing device considers for the first time allocating transmission resources for the frame identified by the index value t.

In a step S501, the managing device obtains information representative of the transmission resources allocated beforehand from the frame identified by the index value t−W−T+2 to the frame identified by the index value t−1. This step S501 corresponds to the step S402 already described with regard to FIG. 4. None of the transmission resources in the frame period corresponding to the frame identified by the index value t has been allocated so far.

In a following step S502, the managing device allocates, to at least one of the K individual transmissions, all the transmission resources of the frame identified by the index value t, e.g. in an arbitrary way. The managing device may however allocate at least one transmission resource in the frame identified by the index value t for future insertion of the signalling information in the frame identified by the index value t. This allocation in the frame identified by the index value t for said signalling information is however not taken into account in the computation of the global figure of merit F(t), since said signalling information relates to the transmission resources allocations of the frame identified by the index value t+x. The managing device then removes at least one transmission resource, from the allocations performed beforehand in the frame identified by the index value t−x for at least one of the K individual transmissions, for insertion of the signalling information, which relates to the frame identified by the index value t, in the frame identified by the index value t−x, unless the managing device has allocated beforehand at least one transmission resource for insertion of said signalling information.

In a following step S503, the managing device computes each figure of merit P(t−u), with u taking values from 0 to W−1, according to the transmission resources allocations resulting from the step S502. Then the managing device computes accordingly the global figure of merit F(t).

In a following step S504, the managing device stores the transmission resources allocation from the frame identified by the index value t−W+1 to the frame identified by the index value t, in association with each figure of merit P(t−u) and the global figure of merit F(t) which were obtained for said transmission resources allocation.

In a following step S505, the managing device checks whether a stop condition is reached. Such a stop condition avoids that the algorithm of FIG. 5 loops forever. Such a stop condition is for instance that a time period of predefined duration has elapsed since the beginning of the execution of the algorithm of FIG. 5. According to another example, such a stop condition is that a quantity of iterations of the step S505 has been reached within one execution of the algorithm of FIG. 5. According to another example, such a stop condition is that no improvement of the global figure of merit F(t) has been obtained after a predefined quantity of successive evaluations of transmission resources allocations changes (detailed hereafter with regard to a step S507). When the stop condition is reached, a step S506 is performed, in which the algorithm ends; otherwise, the step S507 is performed.

In the step S507, the managing device evaluates a change of the transmission resources allocations. The managing device operates in a working window of size W going from the frame identified by the index value t−W+1 to the frame identified by the index value t. No transmission resources allocations performed out of said working window are modified during the current execution of the algorithm of FIG. 5, i.e. the transmission resources allocations performed for the frames identified by an index value strictly lower than t−W+1 are no more modified. To perform the change of the transmission resources allocations, the managing device selects one transmission resource in the working window of size W, e.g. in a round robin fashion. The managing device then tests what becomes of the global figure of merit F(t) when allocating the selected transmission resource to any other transmission, i.e. to perform any other one of the K individual transmission or to transmit signalling information. It has to be noted that modifying the transmission resource allocated to signalling information in a frame identified by an index v impacts the figure of merit P(v+x). The managing device then retains the transmission resources allocation, among the tested transmission resources allocations, which shows the best global figure of merit F(t). At the next iteration of the step S507, the managing device will select another transmission resource to test what becomes of the global figure of merit F(t) when allocating the selected transmission resource to any other transmission.

In a following step S508, the managing device checks whether the global figure of merit F(t) obtained in the step S507 shows improvement compared to the transmission resources allocation previously stored. When the global figure of merit F(t) obtained in the step S507 shows improvement, a step S509 is performed; otherwise, the step S505 is repeated.

In the step S509, the managing device stores the retained transmission resources allocation from the frame identified by the index value t−W+1 to the frame identified by the index value t, in association with each figure of merit P(t−u) and the global figure of merit F(t) which were obtained for said retained transmission resources allocation. Then the step S505 is repeated.

In a particular embodiment, the managing device starts evaluating changes of the transmission resources allocations by testing firstly all possible changes among the transmission resources of the frame identified by the index t−u which shows the worst figure of merit P(t−u) among the working window of size W. If no improvement is obtained for the global figure of merit F(t) after all possible changes among the transmission resources of the frame identified by the index t−u, the managing device switches to evaluating changes of the transmission resources allocations by testing all possible changes among the transmission resources of the frame identified by the index t−u', with 0≤u'<W and u'≠u, which shows the second worst figure of merit P(t−u') among the working window of size W. Otherwise, if improvement is obtained for the global figure of merit F(t) after all possible changes among the transmission resources of the frame identified by the index t−u, the managing device switches to evaluating changes of the transmission resources allocations by testing all possible changes among the transmission resources of the frame that shows now the worst figure of merit P among the working window of size W (since at least one value of the figures of merit P over the working window of size W has changed).

In a particular embodiment, in the dynamic mode, the managing device starts evaluating changes of the transmission resources allocations by testing firstly all possible changes among the transmission resources of the frame identified by the index t−u where the worst result of the following expression occurs among the working window of size W:

$$(1-(1-E_M(k,R_{k,t-u-\tau}))(1-E_B(k,R_{0,t-u-\tau-x})))$$

If no improvement is obtained for the global figure of merit F(t) after all possible changes among the transmission resources of the frame identified by the index t−u, the managing device switches to evaluating changes of the transmission resources allocations by testing all possible changes among the transmission resources of the frame identified by the index t−u', with 0≤u'<W and u'≠u, which shows the second worst result of said expression among the working window of size W. Otherwise, if improvement is obtained for the global figure of merit F(t) after all possible changes among the transmission resources of the frame identified by the index t−u, the managing device switches to evaluating changes of the transmission resources allocations by testing all possible changes among the transmission resources of the frame that shows now the worst figure of merit P among the working window of size W (since at least one value of the figures of merit P over the working window of size W has changed).

In a particular embodiment, in the hybrid mode, the managing device starts evaluating changes of the transmission resources allocations by testing firstly all possible changes among the transmission resources of the frame identified by the index t−u where the worst result of the following expression occurs among the working window of size W:

$$(1-(1-E_M(k,R_{k,t-u-\tau}))(1-E_B^H(k,t-u-\tau,R_{0,t-u-\tau-x})))$$

If no improvement is obtained for the global figure of merit F(t) after all possible changes among the transmission resources of the frame identified by the index t−u, the managing device switches to evaluating changes of the transmission resources allocations by testing all possible changes among the transmission resources of the frame identified by the index t−u', with 0≤u'<W and u'≠u, which shows the second worst result of said expression among the working window of size W. Otherwise, if improvement is obtained for the global figure of merit F(t) after all possible changes among the transmission resources of the frame identified by the index t−u, the managing device switches to evaluating changes of the transmission resources allocations by testing all possible changes among the transmission resources of the frame that shows now the worst figure of merit P among the working window of size W (since at least one value of the figures of merit P over the working window of size W has changed).

The invention claimed is:

1. A method for allocating transmission resources in a wireless communications network for performing, a number (K) of individual transmissions between an access point and a plurality of mobile terminals, the K individual transmissions occurring in the wireless communications network on a per frame basis, the method being performed by a managing device in charge of allocating the transmission resources for performing the K individual transmissions, signalling information intended to enable the plurality of mobile terminals to determine transmission resources that are allocated in a subsequent frame being transmitted in at least one transmission resource of each frame, wherein, for each one of the K individual transmissions, the managing device has information representative of a signal-plus-interference to noise ratio expected for each transmission resource when used by said K individual transmissions, and the managing device has the information representative of the signal-plus-interference to noise ratio expected for each transmission resource when said transmission resource is used for transmitting the signalling information, the method comprising:

when considering the allocating transmission resources for the K individual transmissions in a frame identified by an index value t, the managing device performs the steps of:

obtaining information representative of the transmission resources allocated beforehand from the frame identified by an index value t−W−T+2 to the frame identified by the index value t−1, wherein W≥1 is a first predefined quantity of successive frames and T≥1 is a second predefined quantity of the successive frames;

allocating transmission resources in the frame identified by the index value t for performing the K individual transmissions and the transmission resources in the frame identified by an index value t−x for transmitting the signalling information related to the frame identified by the index value t, by reviewing the transmission resources allocations from the frame identified by an index value t−W+1 to the frame identified by the index value t−1 for maximizing the following expression:

$$\min_{0 \leq u < W} (P(t-u))$$

wherein x≥1 represents a difference in terms of quantity of frames between the frame identified by the index value t and a preceding frame in which is transmitted the signalling information related to the frame identified by the index value t, and wherein W≥x, and wherein P(t−u) is a figure of merit representative of a probability that at least one message in each one of the K individual transmissions is correctly received between the frame identified by the index value t−u−T+1 and the frame identified by an index value t−u in view of the signal-plus-interference to noise ratio; and enabling transmission of the frame identified by an index value t−W−x+1.

2. The method according to claim 1, wherein, for reviewing transmission resources allocations from the frame identified by the index value t−W+1 to the frame identified by the index value t−1, the managing device allocates all the transmission resources of the frame identified by the index value t, and evaluates changes of the transmission resources allocations from the frame identified by the index value t−W+1 to the frame identified by the index value t−1 so as to improve the following expression:

$$\min_{0 \leq u < W} (P(t-u)).$$

3. The method according to claim 2, wherein the figure of merit P(t−u) is defined as follows:

$$P(t-u) = \prod_{k=1}^{K} \left[ 1 - \prod_{\tau=0}^{T-1} (1 - (1-E_M(k,R_{k,t-u-\tau}))(1-E_B(k,R_{0,t-u-\tau-x}))) \right]$$

wherein $E_M(k, R_{k,t-u-\tau})$ represents a probability of error encountered in the individual transmission identified by the index value k by using a set $R_{k,t-u-\tau}$ of at least one transmission resource in the frame identified by the index value t−u−τ;

and wherein $E_B(k, R_{0,t-u-\tau-x})$ represents a probability of error encountered in the signalling information related to the individual transmission identified by the index value k, which is transmitted using a set $R_{0,t-u-\tau-x}$ of at least one transmission resource in the frame identified by the index value t−u−τ−x.

4. The method according to claim 3, wherein, when evaluating said changes of the transmission resources allocations, the managing device starts by testing firstly all possible changes among the transmission resources of the frame showing the worst result of the following expression:

$$(1-(1-E_M(k,R_{k,t-u-\tau}))(1-E_B(k,R_{0,t-u-\tau-x}))).$$

5. The method according to claim 3, wherein, when evaluating said changes of the transmission resources allocations, the managing device starts by testing firstly all possible changes among the transmission resources of the frame identified by the index t−u which shows the worst figure of merit P(t−u).

6. The method according to claim 3, wherein each message to be transmitted in the frame identified by the index value t−u−τ for the individual transmission identified by the index value k is spread over the set $R_{k,t-u-\tau}$ and the probability of error $E_M(k, R_{k,t-u-\tau})$ is expressed as follows:

$$E_M(k,R_{k,t-u-\tau}) = f_M(\{\rho_k(R_{k,t-u-\tau}(i))\}_i)$$

wherein $f_M$ represents a multi-variable function providing data error rate as a function of a set of signal-plus-interference to noise ratios {ρ}, which depends on a behavioural model of physical layer configuration used for performing transmission over the set $R_{k,t-u-\tau}$, and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

7. The method according to claim 3, wherein each message to be transmitted in the frame identified by the index value t−u−τ for the individual transmission identified by the index value k is uniquely transmitted in one transmission resource, and the probability of error $E_M(k, R_{k,t-u-\tau})$ is expressed as follows:

$$E_M(k, R_{k,t-u-\tau}) = 1 - \prod_i (1 - f'_M(\rho_k(R_{k,t-u-\tau}(i))))$$

wherein $f'_M$ represents a function providing data error rate as a function of signal-plus-interference to noise ratio ρ, which depends on a behavioural model of physical layer configuration used for performing transmission over the set $R_{k,t-u-\tau}$, and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

8. The method according to claim 3, wherein each message to be transmitted in the frame identified by the index value t−u−τ for the individual transmission identified by the index value k is repeated in each transmission resource of the set $R_{k,t-u-\tau}$ and expected to be jointly decoded, and the probability of error $E_M(k, R_{k,t-u-\tau})$ is expressed as follows:

$$E_M(k, R_{k,t-u-\tau}) = f_M''\left(\sum_i \rho_k(R_{k,t-u-\tau}(i))\right)$$

wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$, and wherein $f''_M$ represents a function providing data error rate as a function of signal-plus-interference to noise ratio $\rho$, which depends on a behavioural model of physical layer configuration used for performing transmission over the set $R_{k,t-u-\tau}$.

9. The method according to claim 3, wherein each message to be transmitted in the frame identified by the index value t–u–τ for the individual transmission identified by the index value k is repeated in each transmission resource of the set $R_{k,t-u-\tau}$ and expected to be decoded independently, and the probability of error $E_M(k, R_{k,t-u-\tau})$ is expressed as follows:

$$E_M(k, R_{k,t-u-\tau}) = \prod_i (f_M'''(\rho_k(R_{k,t-u-\tau}(i))))$$

wherein $f'''_M$ represents a function providing data error rate as a function of signal-plus-interference to noise ratio $\rho$, which depends on a behavioural model of physical layer configuration used for performing transmission over the set $R_{k,t-u-\tau}$,
and wherein $\rho_k(R_{k,t-u-\tau}(i))$ represents the signal-plus-interference to noise ratio expected to be encountered for the message in the transmission resource $R_{k,t-u-\tau}(i)$ identified by the index i among the set $R_{k,t-u-\tau}$.

10. The method according to claim 3, wherein the signalling information to be transmitted in the frame identified by the index value t–u–τ–x and related to the frame identified by the index value t–u–τ is uniquely transmitted in one transmission resource and the probability of error $E_B(k, R_{0,t-u-\tau-x})$ is expressed as follows:

$$E_B(k, R_{0,t-u-\tau-x}) = f_B(\rho_k(R_{0,t-u-\tau-x}(i)))$$

wherein $f_B$ represents a function providing data error rate as a function of signal-plus-interference to noise ratio $\rho$, which depends on a behavioural model of physical layer configuration used for performing transmission over the set $R_{0,t-u-\tau-x}$,
and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

11. The method according to claim 3, wherein the signalling information to be transmitted in the frame identified by the index value t–u––τ–x and related to the frame identified by the index value t–u–τ is spread over the set $R_{0,t-u-\tau-x}$ and expected to be jointly decoded, and the probability of error $E_B(k, R_{0,t-u-\tau-x})$ is expressed as follows:

$$E_B(k, R_{0,t-u-\tau-x}) = f_B'\left(\sum_i \rho_k(R_{0,t-u-\tau-x}(i))\right)$$

wherein $f'_B$ represents a function providing data error rate as a function of signal-plus-interference to noise ratio $\rho$, which depends on a behavioural model of physical layer configuration used for performing transmission over the set $R_{0,t-u-\tau-x}$,
and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

12. The method according to claim 3, wherein the signalling information to be transmitted in the frame identified by the index value t–u––τ–x and related to the frame identified by the index value t–u–τ is repeated in each transmission resource of the set $R_{0,t-u-\tau-x}$ and expected to be decoded independently, and the probability of error $E_B(k, R_{0,t-u-\tau-x})$ is expressed as follows:

$$E_B(k, R_{0,t-u-\tau-x}) = \prod_i (f_B''(\rho_k(R_{0,t-u-\tau-x}(i))))$$

wherein $f''_B$ represents a function providing data error rate as a function of signal-plus-interference to noise ratio $\rho$, which depends on a behavioural model of physical layer configuration used for performing transmission over the set $R_{0,t-u-\tau-x}$,
and wherein $\rho_k(R_{0,t-u-\tau-x}(i))$ represents the signal-plus-interference to noise ratio expected to be encountered for the signalling information concerning the individual transmission identified by the index k in the transmission resource $R_{0,t-u-\tau-x}(i)$ identified by the index i among the set $R_{0,t-u-\tau-x}$.

13. The method according to claim 2, wherein each frame starts with a fixed field containing further signalling information intended to enable the mobile terminals to determine transmission resources that are allocated in said frame, the figure of merit P(t–u) is defined as follows:

$$P(t-u) = \prod_{k=1}^{K}\left[1 - \prod_{\tau=0}^{T-1}(1-(1-E_M(k, R_{k,t-u-\tau}))(1-E_B^H(k, t-u-\tau, R_{0,t-u-\tau-x})))\right]$$

with $$E_B^H(k,t-u-\tau,R_{0,t-u-\tau-x}) = E_B^S(k,t-u-\tau) \cdot E_B(k,R_{0,t-u-\tau-x})$$

wherein $E_M(k, R_{k,t-u-\tau})$ represents a probability of error encountered in the individual transmission identified by the index value k by using a set $R_{k,t-u-\tau}$ of at least one transmission resource in the frame identified by the index value t–u–τ;
wherein $E_B(k, R_{0,t-u-\tau-x})$ represents a probability of error encountered in the signalling information related to the individual transmission identified by the index value k, which is transmitted using a set $R_{0,t-u-\tau-x}$ of at least one transmission resource in the frame identified by the index value t–u–τ–x,
and wherein $E_B^S(k, t-u-\tau)$ represents a probability of error encountered in the signalling information related to the individual transmission identified by the index value k, which is transmitted in the fixed field of the frame identified by the index value t–u–τ.

14. The method according to claim 13, wherein, when evaluating said changes of the transmission resources allocations, the managing device starts by testing firstly all possible changes among the transmission resources of the frame showing the worst result of the following expression:

$$(1-(1-E_M(k,R_{k,t-u-\tau}))(1-E_B^H(k,t-u-\tau,R_{0,t-u-\tau-x}))).$$

15. The method according to claim 1, wherein the difference in terms of quantity of frames between the frame identified by the index value t and the preceding frame in which is transmitted the signalling information related to the frame identified by the index value t equals to "1".

16. A managing device for allocating transmission resources in a wireless communications network for performing a number (K) of individual transmissions between an access point and a plurality of mobile terminals, the K individual transmissions occurring in the wireless communications network on a per frame basis, signalling information intended to enable the plurality of mobile terminals to determine the transmission resources that are allocated in a subsequent frame being transmitted in at least one transmission resource of each frame, the managing device comprising:

a memory storing, for each one of the K individual transmissions, information representative of a signal-plus-interference to noise ratio expected for each transmission resource when used by said K individual transmissions, and the managing device has the information representative of the signal-plus-interference to noise ratio expected for each transmission resource when said transmission resource is used for transmitting the signalling information; and a processor that, when considering the allocating transmission resources for the K individual transmissions in a frame identified by an index value t, is configured to:

obtain information representative of the transmission resources allocated beforehand from the frame identified by an index value t−W−T+2 to the frame identified by an index value t−1, wherein W≥1 is a first predefined quantity of the successive frames and T≥1 is a second predefined quantity of successive frames;

allocate transmission resources in the frame identified by an index value t for performing the K individual transmissions and transmission resources in the frame identified by an index value t−x for transmitting the signalling information related to the frame identified by the index value t, by reviewing the transmission resources allocations from the frame identified by an index value t−W+1 to the frame identified by the index value t−1 for maximizing the following expression:

$$\min_{0 \leq u < W} (P(t-u))$$

wherein x≥1 represents a difference in terms of quantity of frames between the frame identified by the index value t and a preceding frame in which is transmitted the signalling information related to the frame identified by the index value t, and wherein W≥x, and wherein P(t−u) is a figure of merit representative of a probability that at least one message in each one of the K individual transmissions is correctly received between the frame identified by the index value t−u−τ+1 and the frame identified by an index value t−u in view of the signal-plus-interference to noise ratio; and enable transmission of the frame identified by an index value t−W−x+1.

* * * * *